Aug. 6, 1946.  H. H. TALBOYS  2,405,467
INTERNAL GRINDER AND POLISHER
Filed Jan. 28, 1943  7 Sheets-Sheet 2
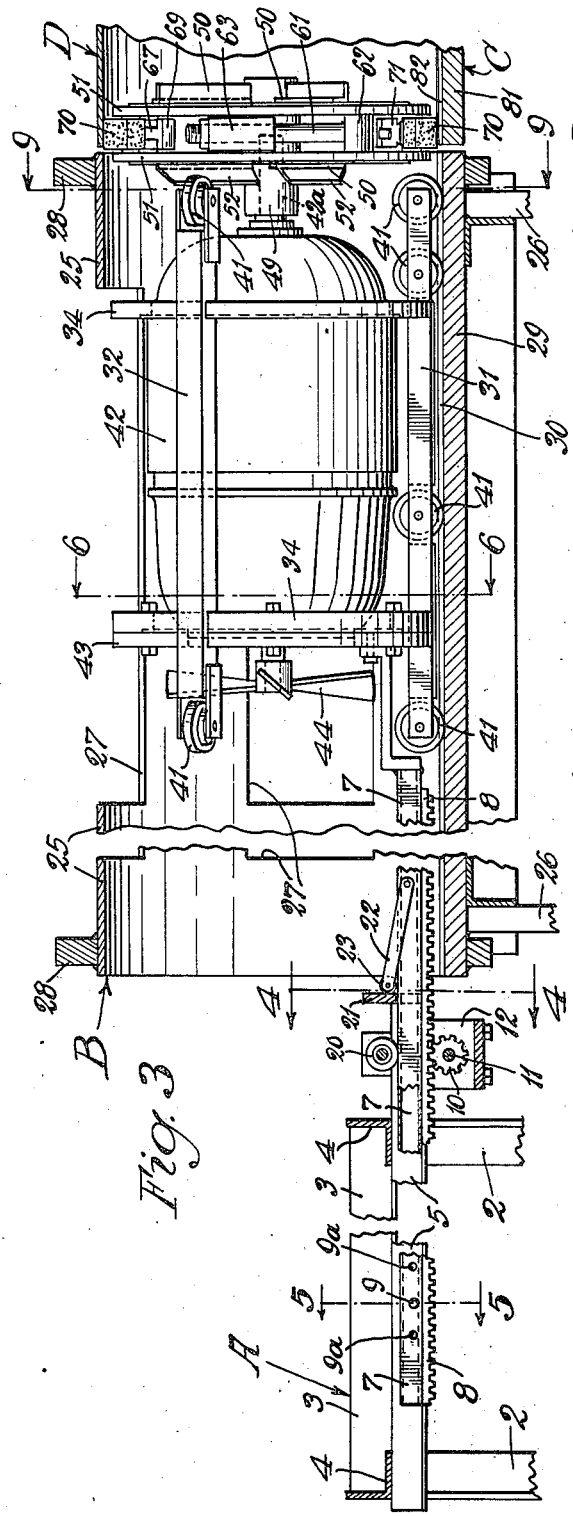
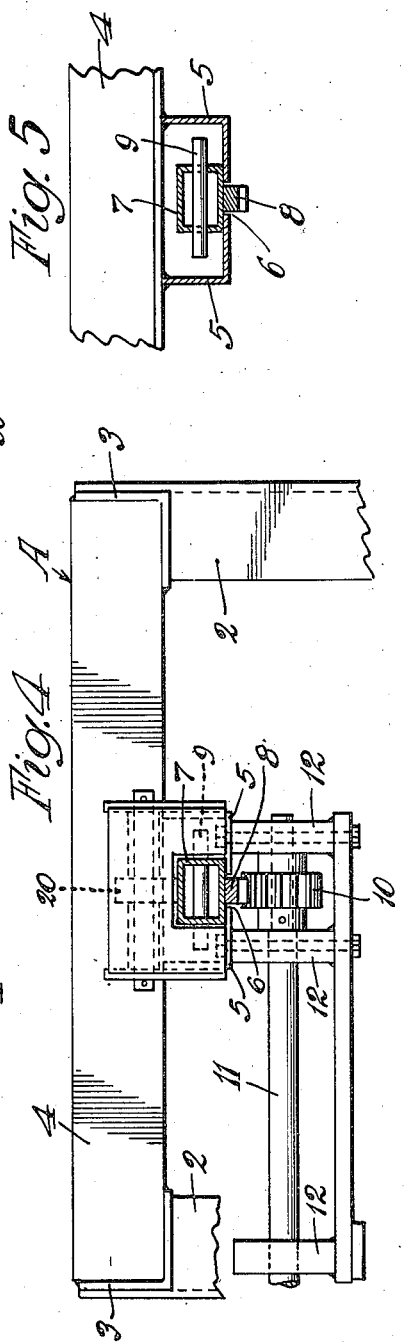
Inventor
Henry H. Talboys
by Parker Carter
Attorneys.

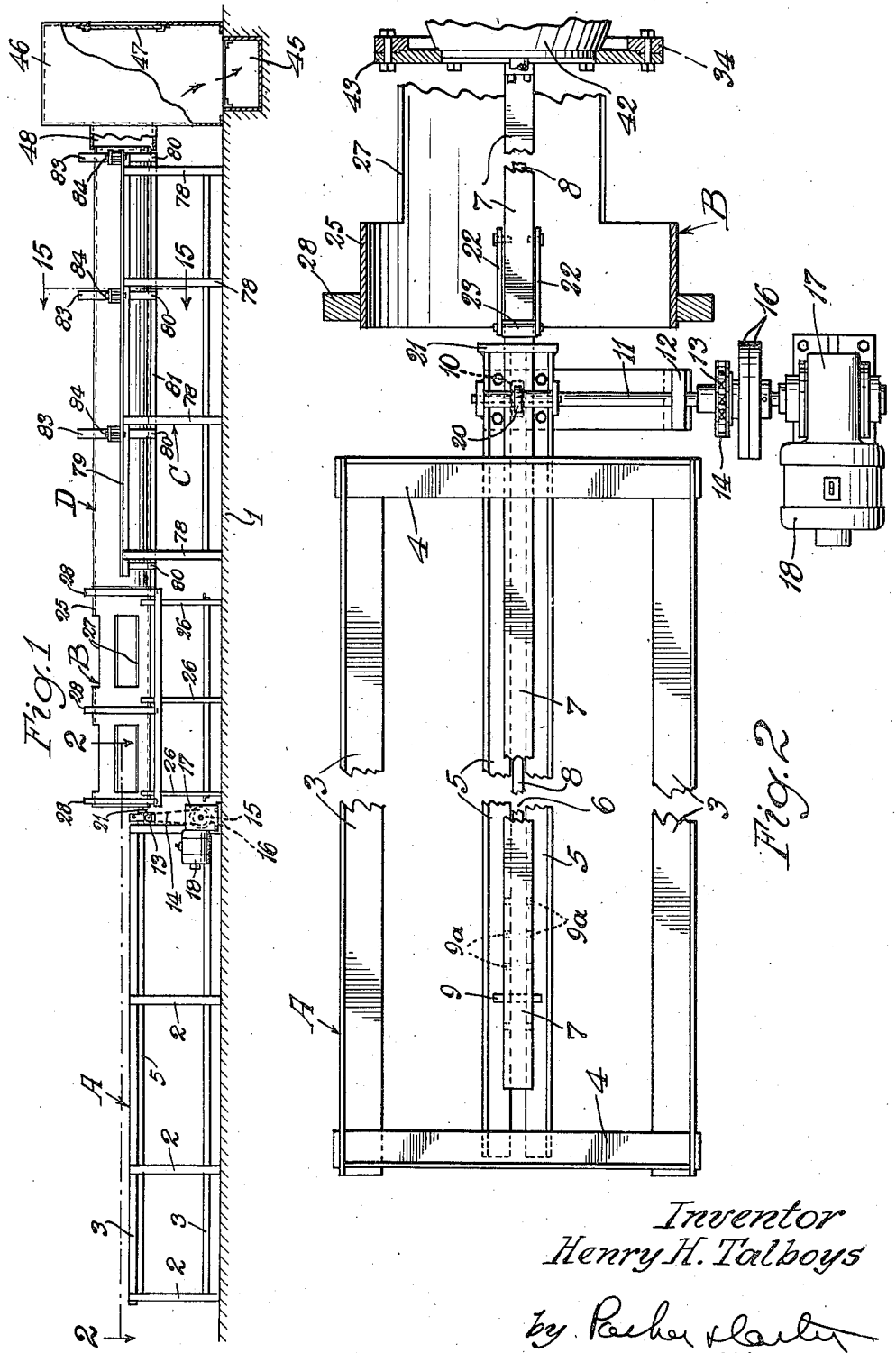

Aug. 6, 1946.  H. H. TALBOYS  2,405,467
INTERNAL GRINDER AND POLISHER
Filed Jan. 28, 1943  7 Sheets-Sheet 3
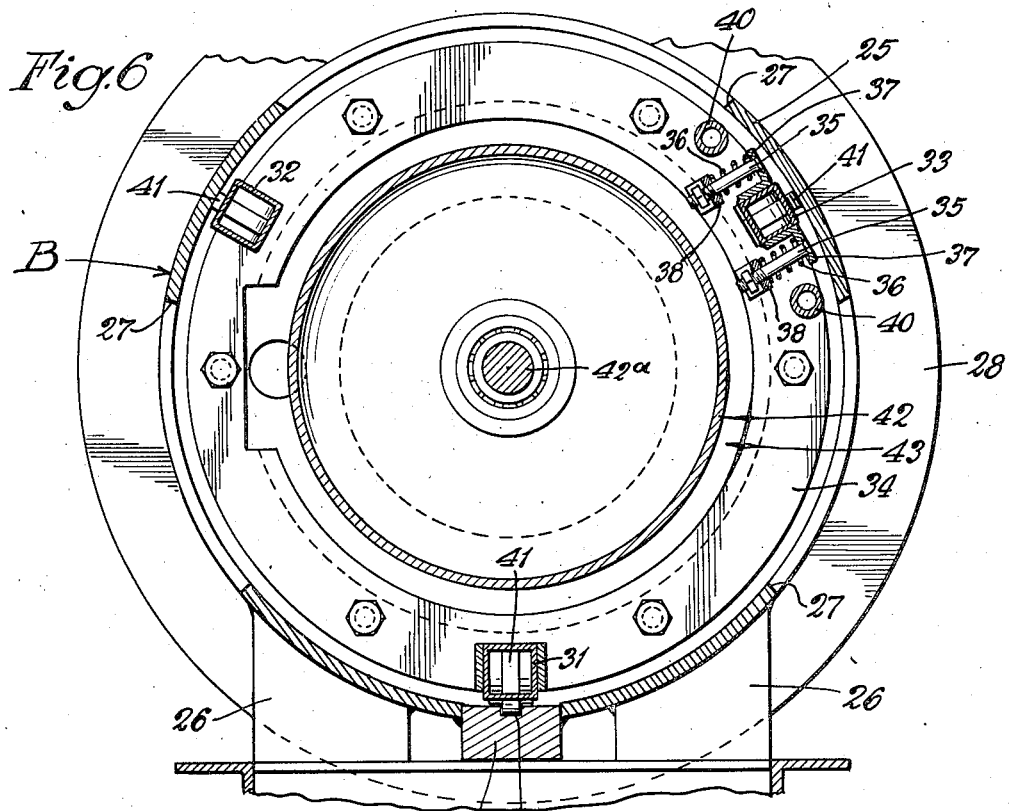
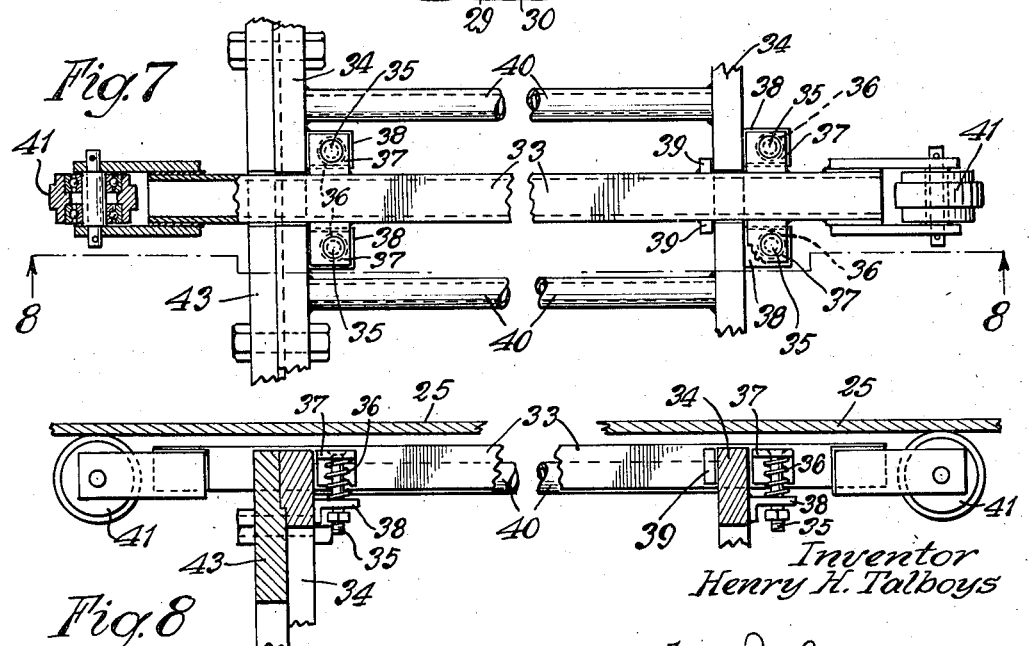
Inventor
Henry H. Talboys
by Packer Plauter
Attorneys.

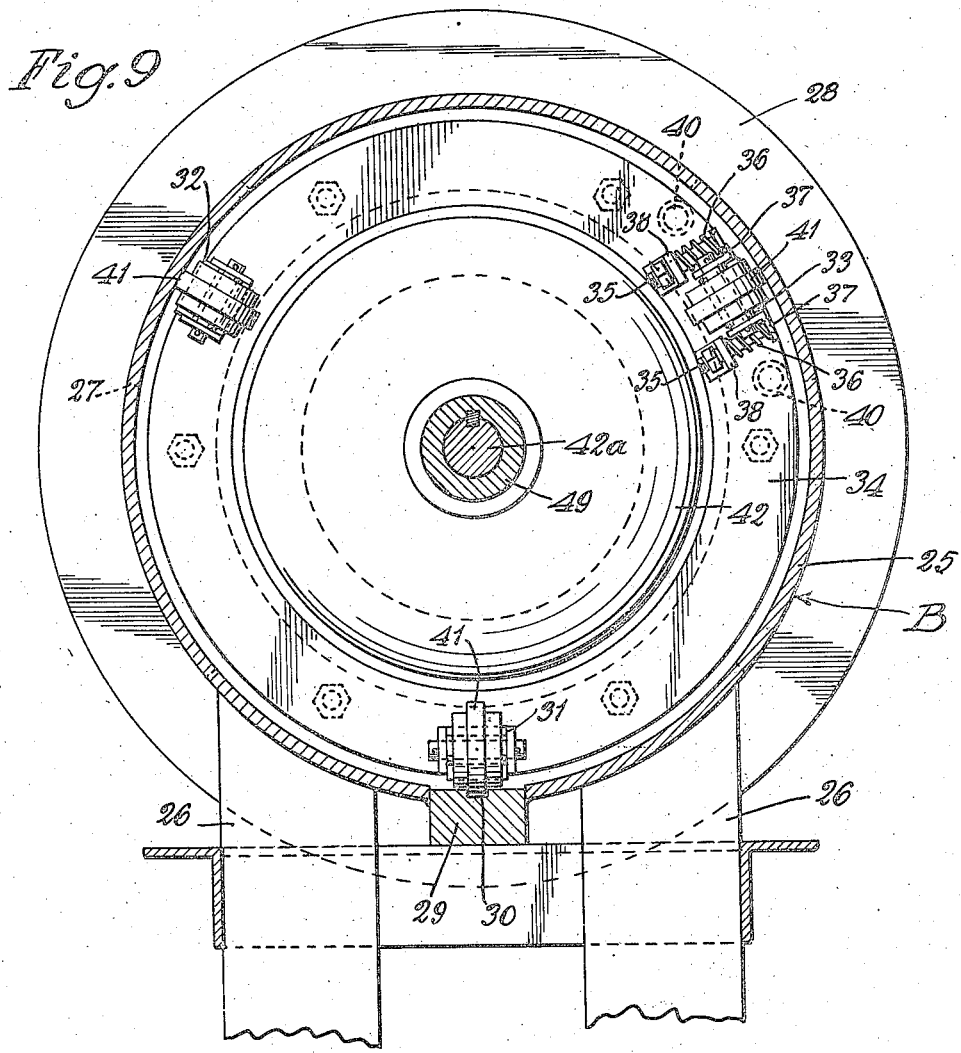

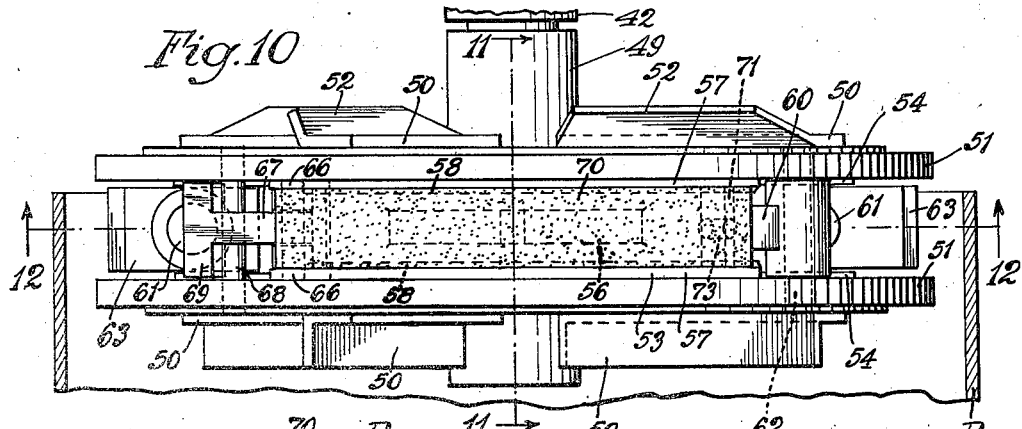
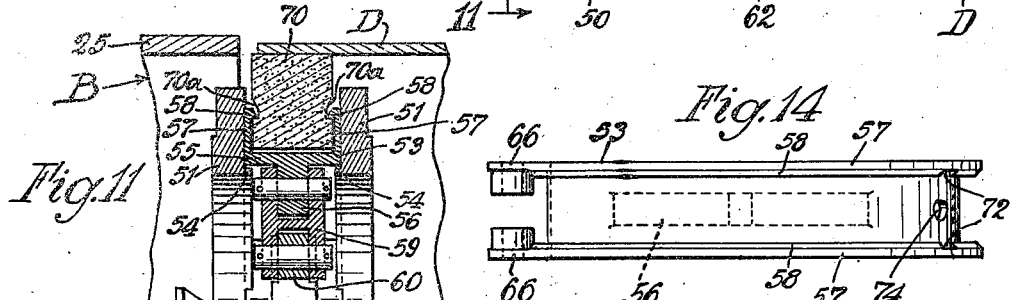
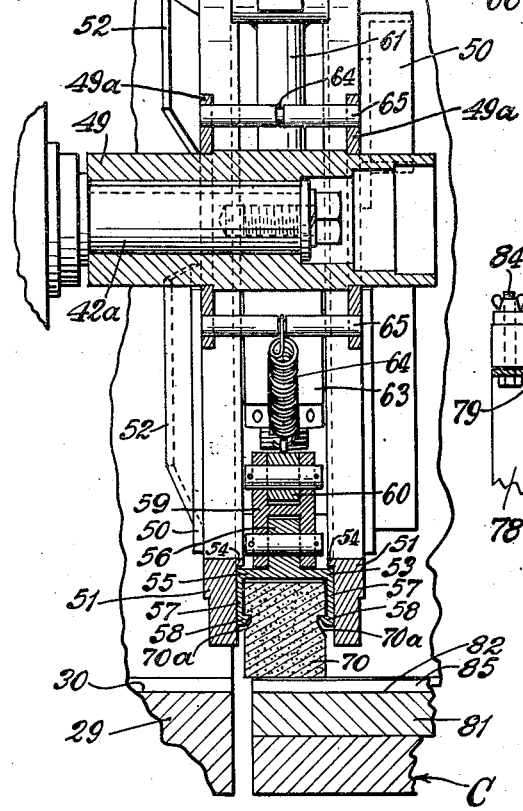
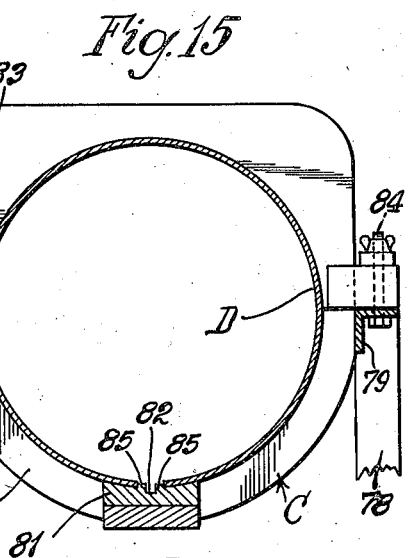

Aug. 6, 1946.    H. H. TALBOYS    2,405,467
INTERNAL GRINDER AND POLISHER
Filed Jan. 28, 1943    7 Sheets-Sheet 6

Inventor
Henry H. Talboys
by Parker Carter
Attorneys

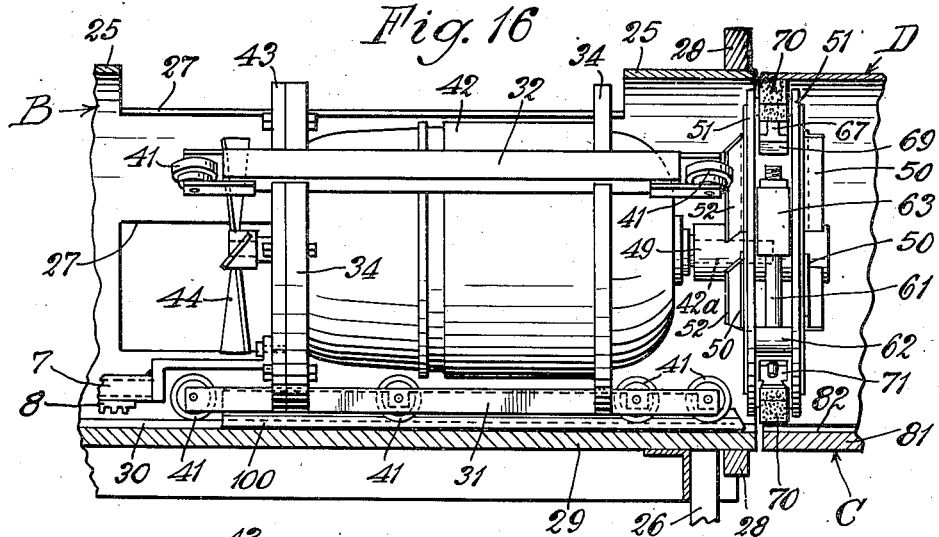
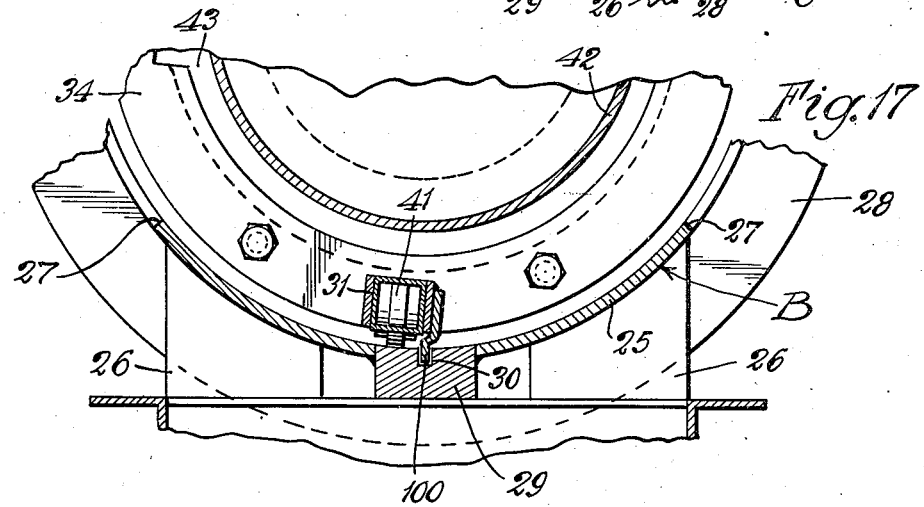
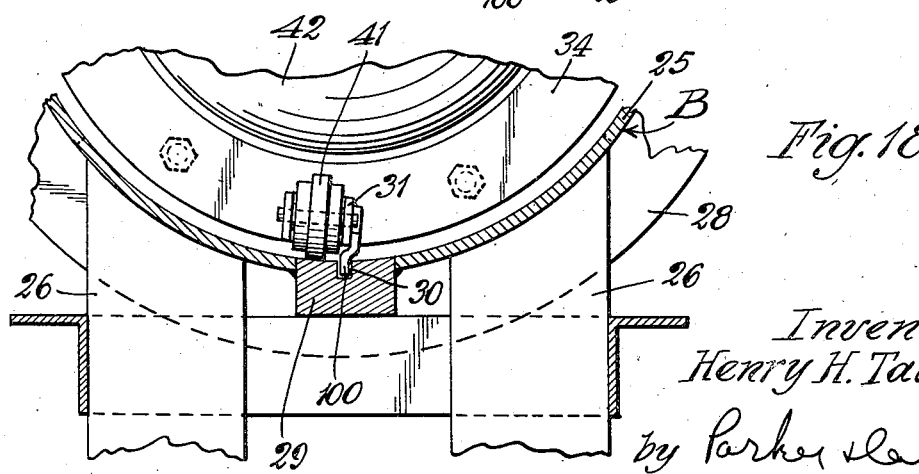

Patented Aug. 6, 1946

2,405,467

UNITED STATES PATENT OFFICE 2,405,467

INTERNAL GRINDER AND POLISHER

Henry H. Talboys, Milwaukee, Wis., assignor to Nordberg Manufacturing Company, Milwaukee, Wis., a corporation of Wisconsin Application January 28, 1943, Serial No. 473,811

20 Claims. (Cl. 51—34)

This invention relates to an improvement in internal grinders and polishers and polishing methods and has for one purpose the provision of an internal grinder effective to finish cylindrical inner surfaces.

One application of the invention is to polish the interior surface of tubes, pipes and the like.

Another purpose is the provision of an improved means and method for truing up inner generally cylindrical surfaces, smoothing the surfaces, grinding down any inequalities and in general finishing the surfaces to form a substantially true cylinder.

Another purpose is the provision of an improved interior grinding means including a power plant and a grinding element or elements which may be bodily conveyed as a unit axially along the member to be polished.

Another purpose is the provision of improved means for guiding and supporting such unit.

Another purpose of the invention is the provision of improved means for adjusting the thrust of the grinding means against an inner surface.

Another purpose of the invention is the provision of improved means for disposing of dust created by the grinding or finishing operation.

Another purpose is the provision of improved feeding means and feed limiting means for such a device.

Another purpose is the provision of an improved grinding head or element.

Another purpose is the provision of an improved means for adjusting the centrifugal thrust of a rotary grinding element.

Other purposes will appear from time to time throughout the specification and claims.

My invention is illustrated more or less diagrammatically in the accompanying drawings, wherein:

Figure 1 is a side elevation with parts in vertical section;

Figure 2 is a section on an enlarged scale along the line 2—2 of Figure 1;

Figure 3 is a partial vertical longitudinal section on the same scale as Figure 2;

Figure 4 is a section along the line 4—4 of Figure 3;

Figure 5 is a section along the line 5—5 of Figure 3;

Figure 6 is a section along the line 6—6 of Figure 3;

Figure 7 is a partial plan view of the carrier for the motor unit;

Figure 8 is a section along the line 8—8 of Figure 7;

Figure 9 is a section along the line 9—9 of Figure 3;

Figure 10 is a plan view of the grinding head;

Figure 11 is a section along the line 11—11 of Figure 10;

Figure 14 is a plan view of a grinding segment holder;

Figure 15 is a section on an enlarged scale along the line 15—15 of Figure 1;

Figures 16, 17 and 18 illustrate details of a slight variation from the corresponding structures shown in Figures 3, 6 and 9 respectively.

Like parts are indicated by like characters throughout the specification and drawings.

Figure 12:
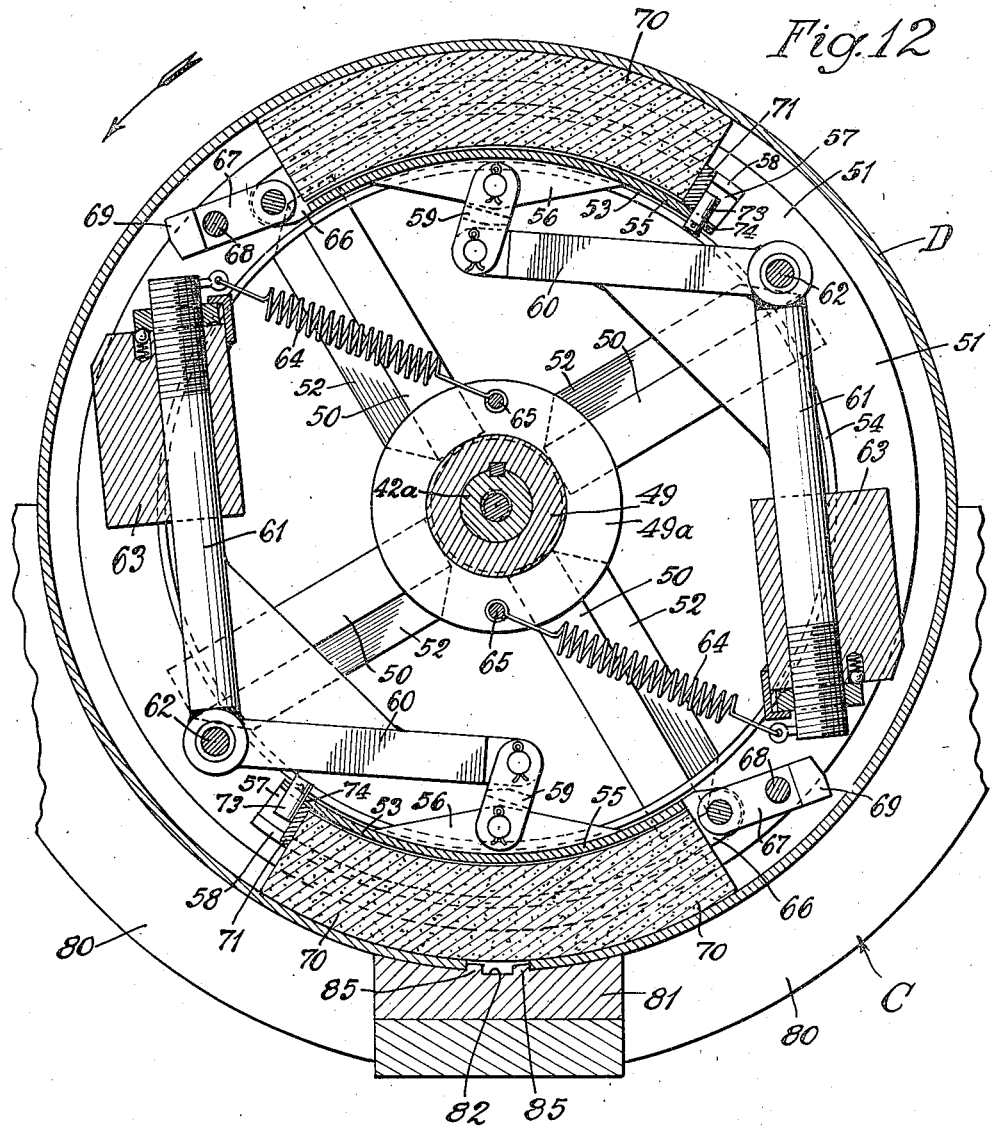
Figure 12 is a section along the line 12—12 of Figure 10.
Figure 13:
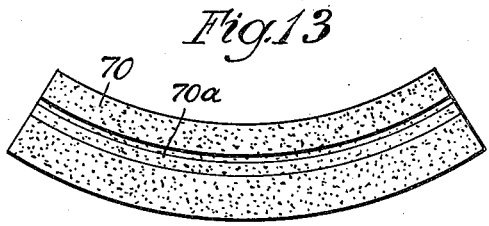
Figure 13 is a side elevation of a grinding segment.

Referring to the drawings and initially primarily to Figure 1, 1 is any suitable supporting surface, floor or the like. The structure supported on the surface includes generally the following elements: A generally indicates a supporting structure for the feeding means for the power and grinder unit below described; B indicates a supporting device for the motor and grinding unit when not in use; C indicates generally, supporting means for the tube or other element, the interior of which is to be ground, finished, or polished.

Referring first to the structure indicated as A, it may be formed in a wide variety of ways but I illustrate a plurality of uprights 2 connected by longitudinally extending angles 3. The angles or the uprights or both may be connected by transversely extended angles 4. Mounted on the transverse members 4 and shown in some detail in Figures 3, 4 and 5, are a pair of longitudinally extending angles 5, the lower flanges of which approach and are divided by a space as at 6. Slidable in the channel thus provided by the angles 4 is any suitable transversely extending thrust member 7, herein shown as a hollow element of rectangular cross section. It is provided with a downwardly extended rack 8, which rides in and is guided longitudinally by the aperture 6. 9 indicates a transverse pin which may be employed as a stop. If desired, a plurality of apertures 9a may be provided for permitting adjustment of the stop, if such adjustment is necessary. The rack is driven by any suitable pinion 10, mounted on a shaft 11, in any suitable bearings 12. The shaft 11 may carry a sprocket 13, about which passes a chain or belt 14, which in turn passes about a sprocket 15, driven by a friction drive 16. 17 is any suitable gear reducer and 18 any suitable source of power such as an electric motor.

It will be understood that the details do not form part of the present invention and what is necessary is some means for driving the pinion 10 and thereby moving the rack 8 alternately in opposite directions. It will be understood, however, that where a series of successive passes is made in order to treat an article of a given length, where it is desired to have the passes extend through a uniform distance at each pass, it may be advantageous to provide any suitable automatic reversing means for reversing the drive at the end of the pass. Since such means are well known, they need not be indicated in detail.

20 illustrates any suitable roller means for holding the rack 8 down against the pinion 11. 21 is a stop plate mounted adjacent the right end of the unit A. Referring to the position of the parts shown in Figure 1, the stop plate 21 may be engaged by the pin 9 at the end of the stroke in one direction or it may be engaged by some corresponding pin at the end of the opposite stroke in another direction. I illustrate, for example, the pivoted links 22 carrying a stop member 23 at their end. In the position in which the parts are shown in Figure 2, it stops the grinding element; in the position in which it is shown in Figure 3, the grinding element is approximately inside the work. If the links 22 are rotated into their opposite position, then the stop 23 will not be effective until after the grinding element has been entirely withdrawn from the work. The friction connection 16 permits slippage when any of the stops engage the plate 21. This protects the motor from burning out.

Controlled or moved by the element 7 and its rack 8, in response to the rotation of the pinion 10, is the motor and grinding unit below described. The motor and grinder unit, when not in use, is housed in a supporting and aligning shell 25 which forms part of the structure B indicated in Figure 1. This shell may be supported in any suitable manner on a plurality of uprights 26. It is also provided with a plurality of cut-outs or open spaces 27, which permit inspection of the motor and grinder unit and gives access to the motor and grinder when housed in the shell 25 and also permits inspection to determine proper alignment between the grinder unit and the work supported on the element C. 28 are any suitable circumferential reinforcing rings. The shell is provided with a bottom piece 29, having a longitudinally extending slot 30. The shell terminates at its right hand end, referring to the position of the parts shown in Figure 3, in a plane perpendicular to the axis of the shell, which permits a close approach of the opposed edge of the work indicated as D.

It will be understood that the internal diameter of the shell 25 is substantially the same as the internal diameter of the work D and also that some means are preferably provided in connection with the work D for continuing the slot 30 or its equivalent. As an example, the whole device may be employed in finishing the interior of a tubular element formed by rolling a sheet of metal together so that the opposite longitudinally extending edges of the sheet approach but do not meet. The space between the approaching edges provides an aperture aligned with and corresponding to the slot 30. It will be understood that the below described motor and grinding unit may be moved freely out of the shell 25 and into the work along the entire length of the work in response to the rotation of the pinion 10 and back through the work in the opposite direction and into the shell 25. In order to support the motor and grinder unit during this excursion, I provide a supporting frame including three longitudinally extending frame elements 31, 32, and 33. The three frame elements are connected by two or more circumferential ring elements 34. The longitudinal elements 31 and 32 may be fixed to the rings 34 by welding or otherwise. Preferably one of the longitudinal elements herein shown as 33 is mounted movably radially in relation to the rings 34 and yielding means are provided for thrusting it radially outward toward the inner surface of the shell 25 or the work D. I illustrate, for example, guiding pins 35 surrounded by compressed spring 36. The guiding pins are connected to the element 33, for example by angles 37, and pass through fixed abutments 38 on the rings 34. Axial movement of the member 33 is prevented for example by any suitable stops or bars 39, which with the angles 37 act as movement limiting means. In order to space the rings 34 axially apart, I also provide braces 40 located adjacent the member 33 and provide the stiffening which 33 cannot give because of its movable relationship with the rings.

Any suitable means may be employed for supporting the above described structure within the inner faces of the member 25 and the work B respectively. I show for example, wheels or rollers 41. The member 31 is shown in Figure 3 as carrying four of these rollers. In the structure shown in Figures 3, 6 and 9, these bottom rollers, mounted on 31, penetrate the slot 30 of the elements 29, and thus prevent rotation of the frame formed by the elements 31, 32 and 33 and the rings 34. I also illustrate rollers 41 at each end of the members 32 and 33, these rollers abutting against the inner surface of the members 25 and D. It will be observed as in Figure 3, that the cut-away portions 27 are out of line with the paths of these rollers.

In the form of Figures 16, 17 and 18, the lower rollers 41a are mounted on the element 31, laterally out of line with the slot 30 of the element 29. Thus all of the sets of rollers as shown in Figures 16, 17 and 18, engage the inner face of the work or of the member 25 and are not relied upon for preventing rotation of the structure. I provide instead a feather or key 100, mounted in any suitable manner on the member 31, and adapted to penetrate the slot 30. This penetration prevents any rotation of the motor and its supporting carrier and has the additional advantage of tending to scour out dust, and shavings from the slot. It is thought to be advantageous to have the rollers directly engage the cylindrical inner surfaces. An accumulation of chips and dust in the slot may be disadvantageous, and may cause irregularities in grinding, unless scrapers or an air jet are employed to keep the slot clear. This is unnecessary in the structures of Figures 16 to 18. It will also be understood that if the work is not itself provided with a slot, other means may be provided to prevent rotation of the body of the motor and support, such as a rigid shaft centered on the motor.

Mounted within the frame thus formed and supported by the rings 34, I illustrate any suitable motor 42, one end of which is seated in the right ring 34, referring to Figure 3, the other being engaged and held in position by any suitable clamp plate 43. Any suitable means may be employed for cooling the motor. For example, a supplemental fan 44 or under some circumstances, the device may be coupled into any suitable suction system. Under general circumstances, it is advantageous to employ the integral fan 44, as shown in Figure 3, operated by the same motor which rotates the grinding head structure. I illustrate for example in Figure 1, the suction duct 45 in communication with the housing 46 with a transparent inspection window 47 and a connecting cylinder 48 approaching closely adjacent the end of the work D, or if desired, slipped over the end of the work D. Thus all dust created by the operation of the device is withdrawn from the area of the work and carried off. However, under most circumstances, I prefer to provide means for causing air to pass about the motor 42, obtaining the double result of cooling the motor and removing dust and grindings from the working area. The fan 44 provides one method for air cooling and dust disposal. It will be noted that the grinding head below described may also be provided with fan means as will later be seen.

Referring next to the grinding structure proper, the motor shaft 42a is surrounded by a sleeve 49 keyed or otherwise firmly secured thereto. 49a, 49a, indicate a pair of hub disks pressed on or otherwise secured to the sleeve 49. Referring for example to Figures 10, 11 and 12, I illustrate a plurality of radial arms 50, four extending from each of the hub plates 49a, each set of arms supporting a ring 51. The arms 50 may include fan vanes 52, the purpose of which has already been discussed. The rings 51 define between them a space for two or more shoes or segment holders, generally indicated at 53. The inward movement of these segment holders toward the axis of the head is limited by inwardly extending flanges 54 on the opposite rings 51. Each segment holder includes an arcuate bottom plate 55 with a radially inwardly extending flange 56 and side plates 57 terminating in inwardly extending flanges 58. The flange 56 has pivoted thereto a link 59, the opposite end of which is pivoted to a lever 60 which with its associated lever 61 forms a bell crank lever structure pivoted at 62 to the rings 51. Adjustable on the lever 61 is a counterweight 63. 64 is a spring extending from the outer end of the lever 61 to the hub plates 49a where, if desired, it may be secured to a pin 65 extending between the hub plates. At the forward end of the shoe are lugs 66 to which are pivoted a link 67 pivoted in turn as at 68 to the rings 51. It may be advantageous to provide a counterweight 69 at the forward end of the link 67. The arrow in Figure 12 indicates the direction of rotation of the above described head. 70 indicate removable abrasive or polishing segments which are provided with channels 70a to receive flanges 58, of the shoe sides 57. The rear end of the shoe is open to permit the insertion of the segments 70 and any suitable retaining plate 71 could be employed. It may, for example, be slipped into slots 72 in the flanges 58. The plate 71 may be locked in its inward position for example by the pin 73 which passes through an aperture 74 in the shoe bottom plate 55.

Referring to the work and the work support, C indicates generally any suitable support or rack for the tubular work D. It includes for example any suitable vertical supports 78 which may support longitudinal extending angles 79. Secured to the angles are any suitable upwardly open, semi-circular supports 80. At the bottom of the members 80 is a longitudinally extending grooved piece 81 with a slot 82 in alignment with the corresponding members 29 and 30 of the shell 25 as shown in Figure 9. 83 indicates any suitable semicircular clamps which may be clamped down in any suitable manner as by bolts 84. The structure thus provided permits the firm locking of the work between the clamps 80 and 83 with the opposite edges of the work cylinder D abutting against the upwardly extended longitudinal flanges 85 which extend along each side of the slot 82.

It will be understood that this particular work detail and detail of work support is not of itself essential. For example, completed tubes may be operated upon in which means associated with the tube itself are employed for immobilizing the opposite edges of the bottom slot. With some modifications, the structure may be employed to polish or finish the interiors of tubes having no break in the surface.

It will be understood that the elements B and C are so proportioned that when the work tube D is clamped in position, it is properly aligned with the shell 25 and the motor and grinding unit moves radially out of the shell 25 into the work tube D and back through the work tube D into the shell 25.

It will be realized that whereas I have shown and described an operative device, still many changes might be made in the size, shape, arrangement and disposition of parts without departing materially from the spirit of my invention and I wish, therefore, that my showing be taken as in a large sense, illustrative or diagrammatic. The use and operation of my invention are as follows:

I provide means for and a method of finishing interior cylindrical or partly cylindrical surfaces. My invention is well adapted to finish interiors of more or less elongated cylindrical members, such as pipes, conduits, and the like. It may be employed to finish interiors of cylindrical tubes or to finish generally cylindrical inner surfaces, which extend about less than 360 degrees of arc. It may be employed to finish interiors of apertures in members, the exteriors of which are square, rectangular or, in general, other than cylindrical. In the particular exemplification of my invention herein described and shown, I move a motor and grinder unit axially along the element to be finished. During the axial movement of the unit, the motor rotates the head in such manner as to cause the abrasive segment 70 to thrust centrifugally outwardly against the inner face of the work D. Centrifugal force is also effective to urge the counterweight 63 generally radially outwardly and there is a balance of two forces. By adjusting the counterweight 63 in relation to its pivot 62, the centrifugal thrust of the abrasive segment 70 against the inner face of the work can be adjusted. The segments 70 and the shoes in which they are mounted, are thrust outwardly in such fashion that centrifugal force permits them to adjust their position in relation to the inner face of the work. For example, and referring to Figure 12, the segment 70 and its supporting shoe are connected by the intermediate link 67 to the rings 51 as at 68 and the link 59 provides a loose connection with a center 62. Thus the subjection of the shoe and segment to centrifugal force results in a generally uniform thrust of all parts of the outer surfaces of the segment against the inner surface of the work.

It will be understood, of course, that the counterweight 63 is so manipulated that the centrifugal thrust of the segment 70 will always exceed the centrifugal outward thrust of the counterweight since otherwise there would be no grinding.

In the use of the device, I find that it operates not merely as a polishing or finishing device but as a truing device. For example, if there are projections or unevennesses in the inner wall of the work, these unevennesses tend to be planed or ground down with considerable rapidity. Inertia prevents a certain adaptation of the shoe 70, to local reductions in radius and thus inward projections or unevennesses tend to be planed or ground off. Experience indicates that not merely minor irregularities or sudden projections are taken out but that the interior of the work is ground down to a close approximation to a truly uniform diameter.

It is even possible to convert a more or less tapered tube from a tube of uneven diameter by controlling the length of the passes and giving the tool a progressively greater number of passes through the initially more restricted part of the tube. My invention may thus be employed to obtain the following effects: (a) The smooth finishing of the interior surface; (b) the elimination of irregularities and sharp variations in radius of the inner surfaces; (c) the general truing up of the inner surface to give it, at any one point, an approximation to truly circular cross section; and (d) rendering the interior of the tubular element of substantially uniform diameter from end to end.

As a specific example of a practical operation of my device, projector tubes for torpedoes may be initially formed from flat sheets of metal, the sheets being bent so that opposite edges approach but do not meet. Such sheets can then be clamped in the supporting structure C as shown in Figure 15 with the opposite edges of the sheet abutting against the flange 85. In that event, the work is clamped in position by the clamps 83. After the initial smoothing has taken place, the tube may then be completed and provided with its own fittings, surrounding rings, reinforcements and the like. This, of course, may take place remote from the structure shown herein. The completed tube, with its longitudinal track can then be dropped into the supporting structure C with its track aligned with the track 29 of the shell 25. In that event, the member 81 is removed from the supports 80. Then the tube may take its final treatment so far as the present method is concerned.

It will be understood that the contacting member or segment 70 may be formed of any suitable substance. It may be abrasive or it may consist of or have secured thereto a polishing element. Under some circumstances, it may even be desirable to substitute a polishing pad or buffer. Any suitable sealing means may be mounted intermediate the ends of the motor carriage to control circulation of the air. It may be advantageous for example to insure that air blows along the key slot and cleans out the loose material resulting from the grinding.

It will be understood that the counterweighting of the shoe 53 provides an automatic adjustment. As the grinding material wears away, the heavy metal shoe advances further from the center of rotation, and thereby increases its centrifugal weight. Also, the counterweight retracts toward the center of rotation and thereby loses some of its centrifugal weight. This compensates for loss of actual weight of grinding material.

In connection with adjusting the counterweight 63 it is important both for controlling the cutting pressure and for compensating for the horse power available. For example, where a relatively small motor is used in a small tube, the thrust cannot be as great as in the event a large motor is used, or as in the event that the power source is located outside of the tube.

It will be also understood that where I employ the term "grinding element," I wish it to be interpreted as of sufficient breadth to cover any suitable grinding or polishing element, polishing pads or the like, and in general, any element operating in any sense abrasively against the surface of the work.

It will also be understood that where in the claims, I employ the term "tubular" or "hollow cylinder," or "hollow cylindrical element" I wish the claims to be interpreted broadly enough to include elements in which the wall of the surface to be finished does not extend entirely about 360 degrees of arc and in which the exterior of the surface to be finished may be square or rectangular or otherwise not cylindrical. The terms "tubular" or "cylindrical" are not intended to be taken completely literally, as my method and apparatus are applicable to finish a wide variety of structures and a wide variety of surfaces, so long as the surfaces to be finished include a substantial cylindrical area or a substantial area arcuate in transverse cross section.

I claim:

1. In a finishing device for finishing the interior surface of a hollow generally cylindrical element, a motor means, means for supporting it within and upon the surface to be treated and for centering it within said element, means for moving it axially along said surface, and a surface grinding element generally concentric with an driven by said motor means and including a surface grinding member mounted to move centrifugally toward the interior surface in response to its rotation by the motor, and means for reversing the movement of said motor means and surface grinding element when the surface grinding element reaches a predetermined point within the hollow element.

2. In a finishing device for finishing the interior surface of a tubular element, a carriage adapted to penetrate the element to be finished, a motor on said carriage, a rotary grinding element on said carriage and a driving connection between the grinding means and the motor, means for propelling the carriage longitudinally along the element to be finished, a centering support adapted to receive the carriage when the carriage is withdrawn from the element, and means for supporting the element in axial alignment with said centering support.

3. In a finishing device for finishing the interior surface of a tubular element, a carriage adapted to penetrate the element to be finished, a rotary grinding element on said carriage and motor means on said carriage for rotating it, means for propelling the carriage longitudinally along and within the element to be finished, a centering support adapted to receive the carriage and motor means when the carriage is withdrawn from the element, and means for supporting the element in axial alignment with said centering support.

4. In a finishing device for finishing the interior surface of a tubular element, a carriage adapted to penetrate the element to be finished, a rotary grinding element on said carriage and means for rotating it, means for propelling the carriage longitudinally along the element to be finished, a centering support adapted to receive the carriage when the carriage is withdrawn from the element, and means for supporting the element in axial alignment with said centering support, and means for preventing rotation of said carriage in relation to said element and said centering support.

5. In a finishing device for finishing the interior surface of a tubular element, a carriage adapted to penetrate the element to be finished, a rotary grinding element on said carriage and means for rotating it, means for propelling the carriage longitudinally along the element to be finished, a centering support adapted to receive the carriage when the carriage is withdrawn from the element, and means for supporting the element in axial alignment with said centering support and means for preventing rotation of said carriage in relation to said element and said centering support including a member projecting radially from said carriage, said centering support and the element to be finished being longitudinally slotted to receive said member.

6. In a finishing device for finishing the interior surface of tubular elements, a carriage including a plurality of longitudinally spaced rings, a plurality of longitudinally extending frame elements connecting said rings, means on said frame elements for contacting the surface to be finished and means for moving said frame elements, with the surface contacting means thereon, into expanded position with the contacting means contacting the inner surface to be treated, and a rotary head mounted on said carriage, and means for rotating it.

7. In a finishing device for finishing the interior surface of tubular elements, a carriage including a plurality of longitudinally spaced rings, a plurality of longitudinally extending frame elements connecting said rings, means on said frame elements for contacting the surface to be finished and means for moving said frame elements, with the surface contacting means thereon, into expanded position with the contacting means contacting the inner surface to be treated including guiding means for one of said frame elements and yielding means tending normally to urge it outwardly in relation to said rings, and a rotary head mounted on said carriage, and means for rotating it.

8. In a finishing device for finishing the interior surface of tubular elements, a carriage including a plurality of longitudinally spaced rings, a plurality of longitudinally extending frame elements connecting said rings, means on said frame elements for contacting the surface to be finished and means for moving said frame elements, with the surface contact means thereon, into expanded position with the contacting means contacting the inner surface to be treated, and a rotary head mounted on said carriage, and means for rotating it including a motor mounted on and moving with said carriage.

9. In a finishing device for finishing the interior surfaces of tubular elements, a carriage adapted to penetrate the tubular element to be finished, a rotary head mounted on said carriage and means for rotating it, and means for moving said carriage longitudinally along and within the tubular element including a rack extending longitudinally from said carriage, a pinion in mesh with said rack and means for rotating said pinion.

10. In a finishing device for finishing the interior surfaces of tubular elements, a carriage adapted to penetrate the tubular element to be finished, a rotary head mounted on said carriage and means for rotating it, and means for moving said carriage longitudinally along and within the tubular element including a rack extending longitudinally from said carriage, a pinion in mesh with said rack and means for rotating said pinion and driving means for said pinion including a frictional connection.

11. In a finishing device for finishing the interior surfaces of tubular elements, a carriage adapted to penetrate the tubular element to be finished, a rotary head mounted on said carriage and means for rotating it, and means for moving said carriage longitudinally along and within the tubular element including a rack extending longitudinally from said carriage, a pinion in mesh with said rack and means for rotating said pinion, and limit means associated with said rack and adapted to terminate the excursion of the carriage.

12. In a finishing device for finishing the interior surfaces of tubular elements, a carriage adapted to penetrate the tubular element to be finished, a rotary head mounted on said carriage and means for rotating it, and means for moving said carriage longitudinally along and within the tubular element including a rack extending longitudinally from said carriage, a pinion in mesh with said rack and means for rotating said pinion, and adjustable limit means associated with said rack and adapted to terminate the excursion of the carriage.

13. In a finishing device for finishing the interior surfaces of tubular elements, a carriage adapted to penetrate the tubular element to be finished, a rotary head mounted on said carriage and means for rotating it, and means for moving said carriage longitudinally along and within the tubular element including a rack extending longitudinally from said carriage, a pinion in mesh with said rack and means for rotating said pinion, and means for changing the direction of drive of the pinion when the carriage reaches a predetermined point in its movement along a tubular element.

14. In a finishing device for finishing the interior surfaces of tubular elements, a carriage adapted to penetrate the tubular element to be finished, a motor on said carriage, a rotary head on said carriage, a driving connection between said rotary head and said motor and means for causing a flow of air about said motor and across the area of contact between said rotary head and the work including fan means driven by said motor.

15. In a finishing device for finishing the interior surface of longitudinally slotted tubular elements, a carriage adapted to penetrate the element to be finished, a rotary grinding element in said carriage, and means for rotating it, means for propelling the carriage longitudinally along the element to be finished, a centering support adapted to receive the carriage when the carriage is withdrawn from the element, means for supporting the element in axial alignment with said centering support, and means for preventing rotation of said carriage in relation to said element and said centering support, including key means projecting generally radially from said carriage and penetrating said slot.

16. In a finishing device for finishing the interior surfaces of tubular elements, a carriage adapted to penetrate the tubular element to be finished, a rotary head on said carriage and means for rotating it, means for moving said carriage into, along, and out of a tubular element, and means for securing said tubular element in alignment with the path of movement of said carriage, means for supporting said carriage in alignment with said tubular element, and adjacent the end of the tubular element, when the carriage has been removed from the tubular element, and means for preventing rotation of the carriage, effective when the carriage is in the tubular element and when it is on said exterior supporting means.

17. In a finishing device for finishing the interior surfaces of tubular elements, a carriage adapted to penetrate the tubular element to be finished, a supporting means for supporting said carriage adjacent an end of the tubular element and in alignment with the interior of said element, centering and supporting elements on said carriage for engaging the inner face of the tubular element, the exterior supporting means for the carriage including walls in general alignment with the tubular element and adapted to receive said centering and supporting elements on the carriage and to permit ready movement of the carriage into and out of the tubular element, and means, effective when the carriage is on said supporting means and when it is in the tubular element, for preventing rotation of the carriage.

18. In a finishing device for finishing the interior surfaces of tubular elements, a carriage adapted to penetrate the tubular element to be finished, a supporting means for supporting said carriage adjacent an end of the tubular element and in alignment with the interior of said element, centering and supporting elements on said carriage for engaging the inner face of the tubular element, the exterior supporting means for the carriage including walls in general alignment with the tubular element and adapted to receive said centering and supporting elements on the carriage and to permit movement of the carriage into and out of the tubular element, one or more of said centering elements being positioned to penetrate longitudinally extending slots in said supporting means and in the tubular element, and being adapted, in cooperation therewith, to prevent rotation of the carriage.

19. In a finishing device for finishing the interior surface of a tubular element, a carriage adapted to penetrate the element to be finished, centering and supporting connections between the carriage and the opposed inner surfaces of the element, constituting the sole supporting means for the carriage during its penetration within the element, means for preventing rotation of the carriage, a rotary finishing head on said carriage, a motor supported on said carriage, adapted to rotate said finishing head, and means for propelling the carriage longitudinally along and within the tubular element.

20. In a finishing device for finishing the interior surface of a tubular element, a carriage adapted to penetrate the element to be finished, centering and supporting connections between the carriage and the opposed inner surfaces of the element, constituting the sole supporting means for the carriage during its penetration within the element, means for preventing rotation of the carriage, a rotary finishing head on said carriage, a motor supported on said carriage, adapted to rotate said finishing head, and means for propelling the carriage longitudinally along and within the tubular element.

HENRY H. TALBOYS.